United States Patent [19]

Marquardt

[11] 4,225,172
[45] Sep. 30, 1980

[54] FLEXIBLE CONNECTION FOR CABLE WIRE ROPE ENDS

[76] Inventor: Bruno Marquardt, Adelbylund 17, Flensburg, Fed. Rep. of Germany

[21] Appl. No.: 951,311

[22] Filed: Oct. 13, 1978

[30] Foreign Application Priority Data

Oct. 13, 1977 [DE] Fed. Rep. of Germany ....... 2746026

[51] Int. Cl.³ .............................................. B66C 1/12
[52] U.S. Cl. ................................. 294/74; 294/86 CG
[58] Field of Search .......... 294/86 CG, 74; 272/8 W, 272/27 N; 24/122.3, 122.6, DIG. 16, DIG. 17

[56] References Cited

U.S. PATENT DOCUMENTS

| 1,994,674 | 3/1935 | Van Inwagen, Jr. | 294/86 CG |
| 2,017,625 | 10/1935 | Kellems | 294/86 CG |
| 2,740,178 | 4/1956 | Kellems | 294/86 CG |
| 3,638,987 | 2/1972 | Fidrych | 294/86 CG |

Primary Examiner—James B. Marbert
Attorney, Agent, or Firm—Becker & Becker, Inc.

[57] ABSTRACT

A flexible connection for a cable wire rope end, in which the cable wire rope end is enveloped in a hose-like braided sleeve of wire which has an inner diameter which when pushed together in axial direction is greater and when stretched in axial direction is less than the diameter of the cable wire rope end. The braided sleeve has the rim which extends around the cable wire rope sewed or spliced or hooked to the material of the sleeve.

13 Claims, 8 Drawing Figures

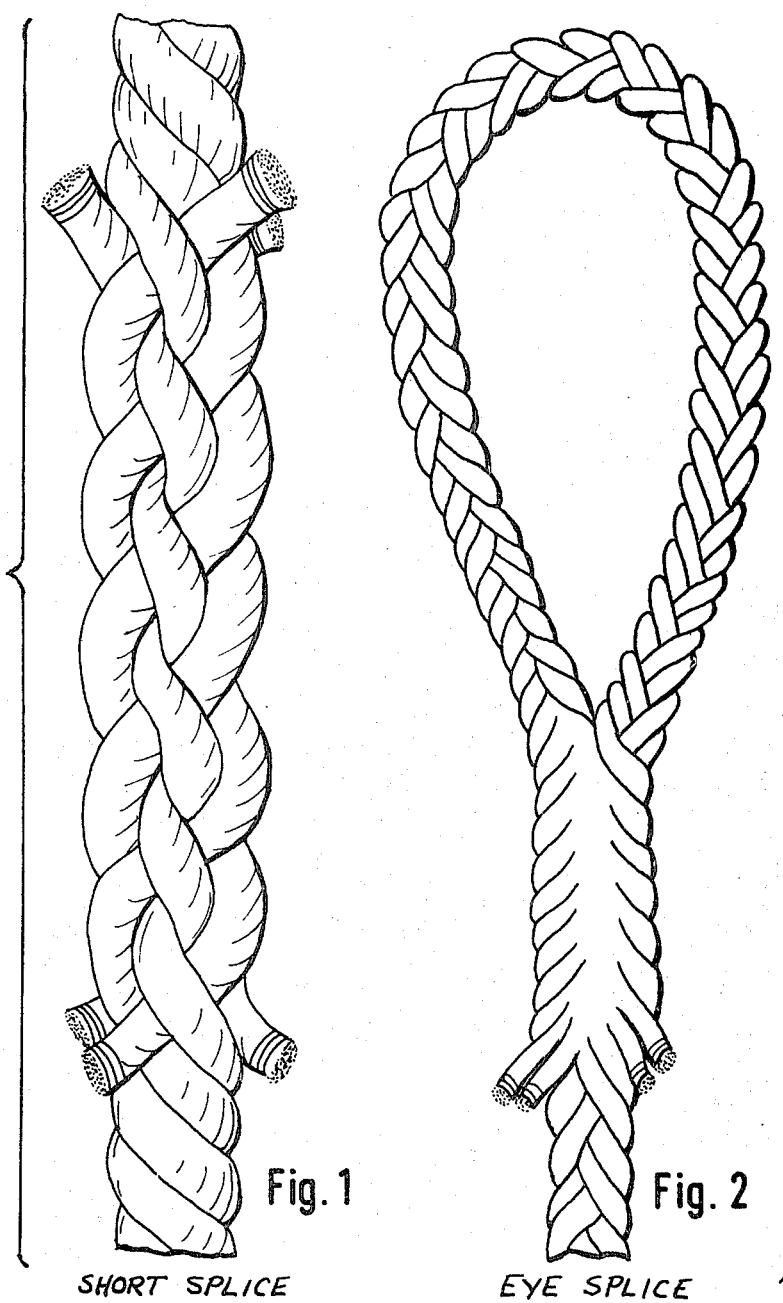
Fig. 1 SHORT SPLICE
Fig. 2 EYE SPLICE

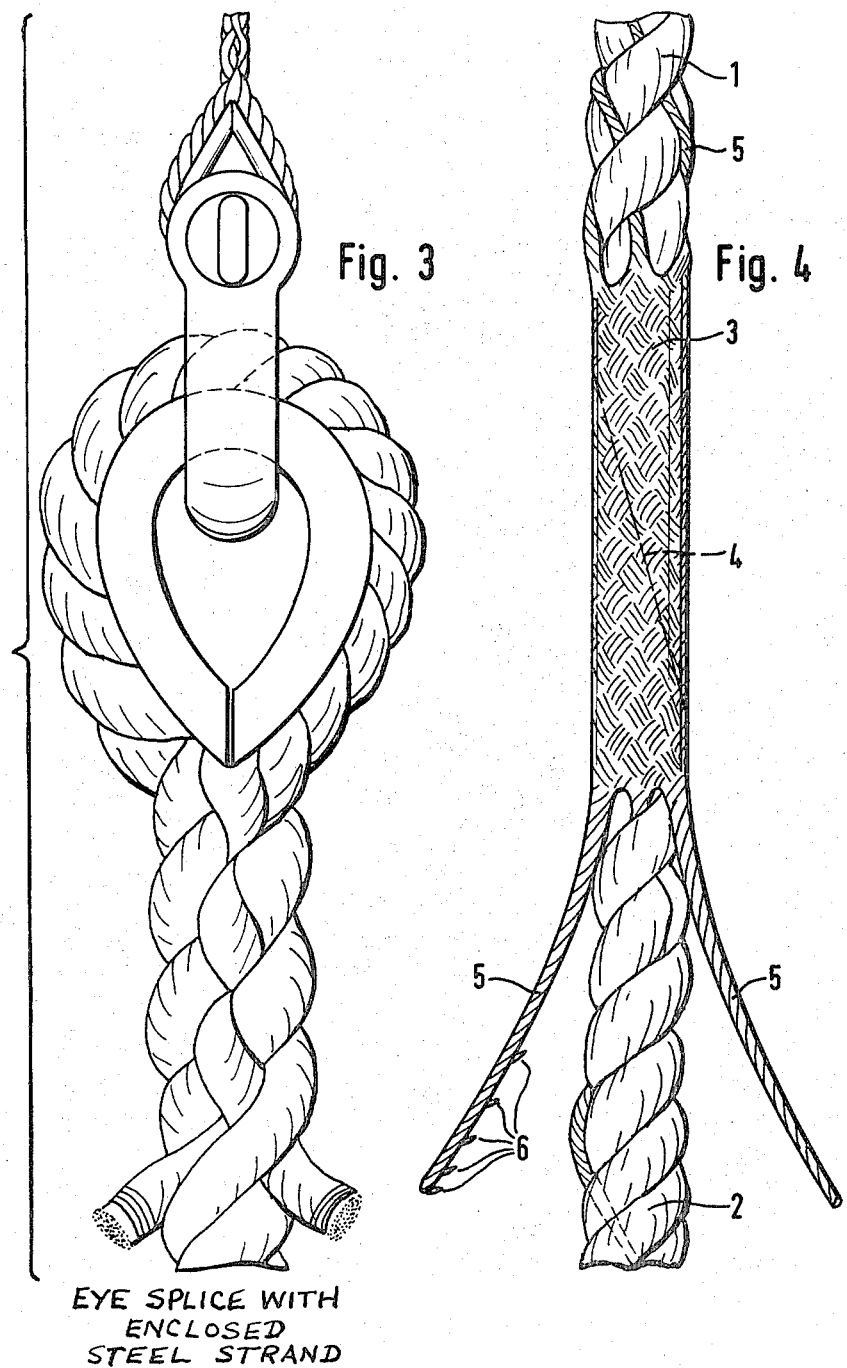

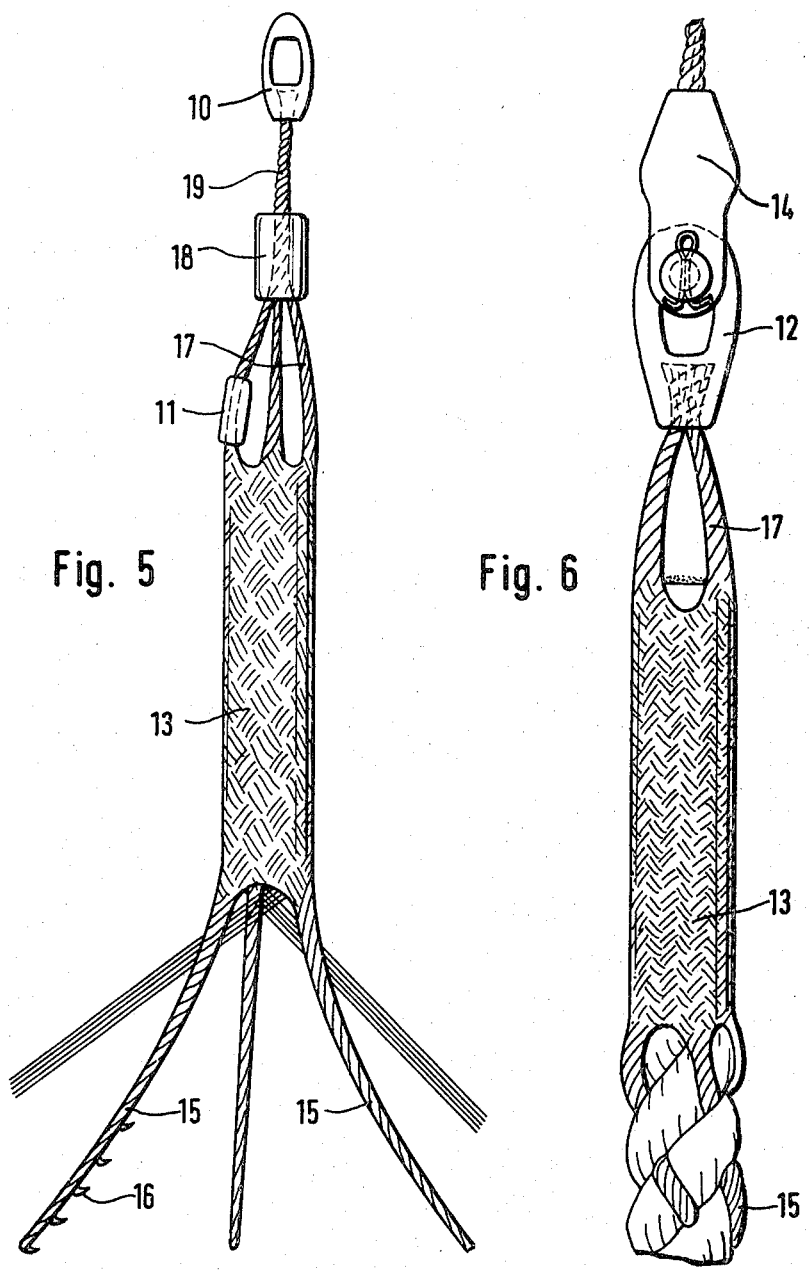

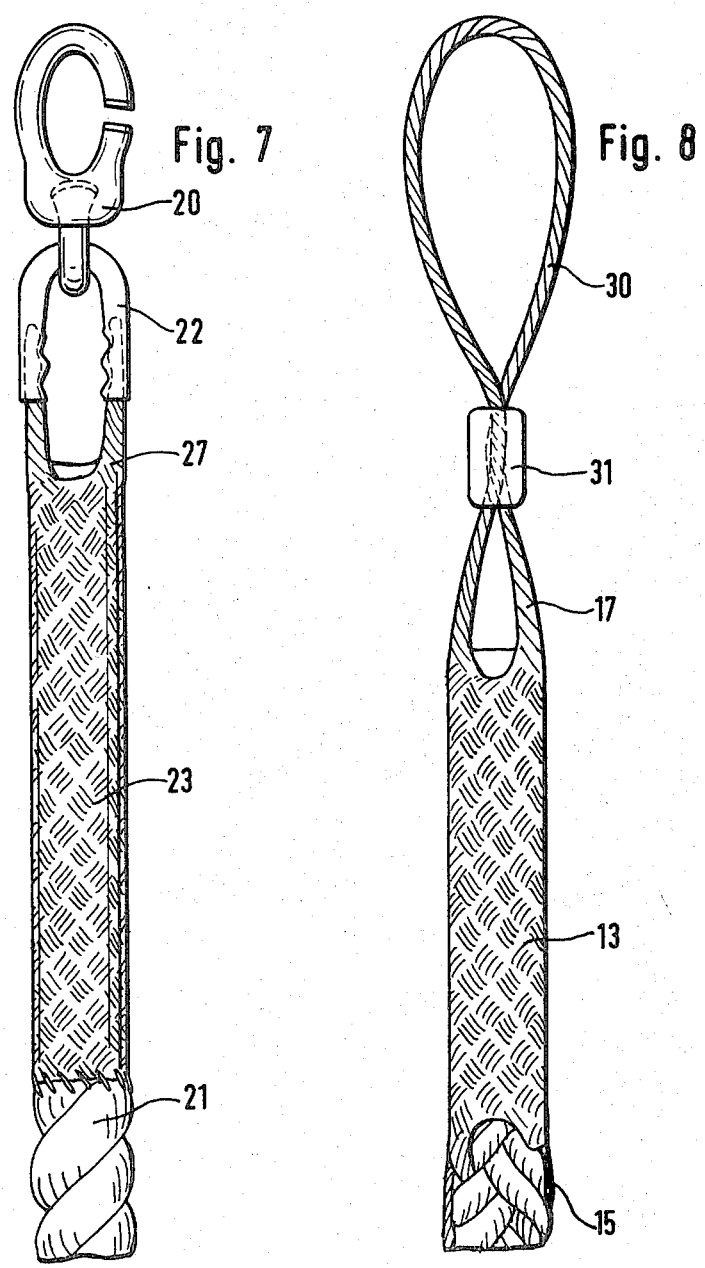

FLEXIBLE CONNECTION FOR CABLE WIRE ROPE ENDS

The present invention relates to a flexible connection for the ends of cable wire ropes. As a rule, the ends of cable wire ropes are interconnected by splicing, regardless of whether a short splice is involved between the ends of cable wire ropes or whether an eye splice is involved which furnishes the possibility to connect additional connecting elements. With all heretofore known splice connections, the drawback is encountered that at the splicing area a thickened portion is created. This thickening portion enters the cable unit with double strength since two equally thick rope ends overlapping each other are spliced together. For the sake of completeness there may also be mentioned the so-called long splice which does not create a thickened portion in the connected cables or ropes but which considerably reduces the pulling strength of the cable so that, in most instances, it does no longer meet the safety requirements. The long splice has the further drawback that relatively large amounts of material are wasted.

Thickened areas on spliced together rope sections are disadvantageous because the running capability of moving cables is greatly reduced. In addition thereto, the splicing of the cable ends is time consuming and thus expensive.

It is, therefore, an object of the present invention to provide an improved flexible connection of cable wire ropes which will not create a thickening at the connecting areas and which can be carried out with a minimum of work and in a minimum of time.

This object and other objects and advantages of the invention will appear more clearly from the following specification in connection with the accompanying drawings, in which:

FIG. 1 illustrates two cable ends interconnected by a short splice according to the prior art.

FIG. 2 is an eye splice according to the prior art.

FIG. 3 shows an eye splice with enclosed steel thimble likewise according to the prior art.

FIG. 4 represents a flexible connection according to the present invention between two cable wire rope ends.

FIG. 5 shows a flexible connecting sleeve for connecting wire cables to cable rope wires according to the invention.

FIG. 6 illustrates a flexible connection according to the invention between a cable wire end and a wire cable connection.

FIG. 7 shows a flexible connection according to the invention between a cable wire end and a swivel hook.

FIG. 8 illustrates a flexible connection according to the invention with a cable wire end and a pressed-on wire eye.

The flexible connection for cable wire ends according to the present invention is characterized primarily in that the cable wire end is surrounded by a hose-like braided sleeve of wire having an inner diameter which in axially pushed together condition is larger and in axially stretched out condition is less than the diameter of the cable end, while the sleeve at the rim surrounding the cable wire rope is sewn thereto or is spliced to or interhooked with strands formed of the sleeve material.

The sleeve according to the invention, as it is known, for instance, as protective envelope or sleeve for electric cables, is sufficiently flexible and when being pushed together in its longitudinal direction increases in diameter. If, on the other hand, the sleeve is pulled apart in the longitudinal direction, its diameter is reduced. The present invention is based on these above mentioned three functional features of such sleeve. The flexibility of the cables interconnected by such sleeve remains substantially unaffected. Due to the great adaptability of the sleeve, the diameter of the connecting area will become only slightly greater than the diameter of the cables connected to each other. The increase in the diameter of the sleeve, as it results from the pushing together of the sleeve, permits a problem-free installation on the cable end or cable ends. Due to the decrease in the diameter of the sleeve caused by pulling the sleeve apart, the required holding force is created. With increasing pull, the sleeve will embrace the inserted cable wire rope end to an ever increasing degree so that the interconnecting and holding force will increasingly but gently become stronger. Also the profile of the wire braiding resting upon the cable ends is very well suited to firmly grip the cable wire rope end due to the pressure acting from the outside.

A further feature of the present invention consists in that the strands formed at the rim of the sleeve material are tapered and are provided with formed-on barbs so that the splicing between the cable wire rope and the sleeve rim cannot become detached.

If two cable wire rope ends are to be interconnected, these ends may in the center of the sleeve be tapered to the same extent and may be arranged so as to overlap each other so that, in response to any pulling forces, no contraction can occur in the center of the sleeve. If the connection according to the invention is to be carried out in connection with thimbles or shackles, or if it is to be formed into an eye, the sleeve may at its portion located ahead of the cable end be compressed or it may be divided into two or more strands serving as connecting ends for a coupling member.

Referring now to the drawings in detail, FIGS. 1-3, representing the prior art, illustrate that with the heretofore known way of splicing there is always created a thickened portion. With a cable wire rope connection according to FIG. 1, the running ability of the spliced cable wire rope is considerably affected. Moreover, the preparation of such a splice connection according to FIG. 1, as well as the eye splicing according to FIGS. 2 and 3, is very time consuming and therefore expensive. With the known eye splicing it is further disadvantageous that it results in a considerable loss in expensive cable wire rope and that such eyes are in most instances very thick and unhandy for hawses and eyelets. Such cable eyes will also relatively easily wear or chafe through. This is the case also when the eye of a cable wire rope is additionally protected against chafing through by a steel thimble. It is also known that cable wire rope eyes with steel thimble used with running equipment are always problematic and easily cause accidents.

The crux of the connections according to the invention, as described in connection with FIGS. 4 to 8, is a braided sleeve of wire as it is known per se, for instance, as outer protective mantle for electric cables. If such sleeves are placed on cable wire ropes and are subjected to pulling stresses in the longitudinal direction of the cable ends, the sleeve diameter will be reduced so that the sleeve is able to surround a cable wire rope with a firm grip. It is, of course, to be understood that such braided sleeve of wire has, as to its permissible stresses, to correspond to at least the permissible stresses to which the respective cable is subjected. When smaller or weaker flexible connections are involved, the braided sleeve may be produced from simple wires. Preferably, however, hammered (geschlagenes) wire material is used for such sleeves.

According to the embodiment illustrated in FIG. 4, two cable wire rope ends 1 and 2 are interconnected by means of a braided sleeve 3 made of wire. For preparing such a connection, the two rope ends 1 and 2, as diagrammatically shown at 4, taper and overlap each other. For the preparation of the connection, the sleeve 3 is first at its ends separated into a plurality of strands 5. Depending on the type of the rope ends and corresponding to the circumference of the braided sleeve 3, two, three or more strands 5 are formed at the sleeve ends. The thus formed strands 5 are preferably tapered at their outer ends as indicated in the lower portion of FIG. 4.

When preparing the flexible connection according to the invention, the sleeve 3 is first upset in axial direction, whereupon from both ends the cable ends to be interconnected are introduced. Subsequently, the sleeve 3 is, starting from the center, stretched out in longitudinal direction, whereupon the strands 5 will be spliced to the cable. The upper portion of FIG. 4 shows the finished splicing, while the lower portion of FIG. 4 shows the start of the splicing operation, only one strand 5 having so far been pulled into the cable. It is of particular advantage when at the tapering end of the outer end of the strand barbs 6 are provided which prevent an accidental slipping out of the sleeve ends from the cable.

The flexible connection according to FIG. 4 also is suited for the repair of broken cable wire ropes or for extending too short cables. The connection according to the invention is always of particular advantage when a slender flexible cable connection is needed, for instance, for the reeving (Einscheren) of new cables into tackles, blocks, disc holes and hawses. In the fishing industry the flexible connection according to the invention can be employed for the running shrouds of the nets.

The embodiment illustrated in FIG. 5 concerns a connection of a wire cable with a cable wire rope. Also in this instance the non-illustrated cable wire rope end is inserted into a braided sleeve 13. The connection of the lower rim of sleeve 13 with the rope is effected precisely in the same manner as described in connection with FIG. 4 with the strands 15 to be spliced in. The strands 15 may be provided with barbs 16. Above the free end of the cable wire rope end to be inserted into the sleeve 13, again some strands 17 have been formed from the sleeve 13. In the present instance, three strands 17 are provided which above a fitted connecting sleeve 18 are clinched together to one leading cable 19. A cable coupling member 10 may be cast onto the hammered leading cable 19. In addition thereto, also connecting sleeves 11 may be provided which are fitted upon the individual strands 17 at the transition or merging area with the braided section of the sleeve 13.

The lower portion of FIG. 6 shows how the flexible connection according to FIG. 5 looks after connection with a cable wire rope end. In the upper portion of FIG. 6 there is shown a somewhat different connection to a wire cable. According to this last mentioned connection, the strands 17 provided at the upper end of the braided sleeve are cast into a coupling member 12 for wire cables. The coupling member 12 is, through the intervention of a coupling bolt, connected to a further coupling member for the wire cable 14 into which one end of a wire cable is cast. Such a connection is suited, for instance, for connecting rope leads to traction cables, as they are employed, for instance, with tug boats. Also in this instance the advantage of a slender and handy transition area is realized. A rope provided with the connection according to the invention can be wound onto the winches without unbalance by narrow hawses and cable guiding means. Also in this instance an increase in the useful life span of the cable wire rope is obtained due to the fact that a splicing is not needed. The heavy shackle and the large rope thimble are replaced by the smaller and lighter cable wire rope couplings.

FIG. 7 shows a flexible connection according to the invention between a cable wire rope 21 and a U-shaped sleeve 22. In this instance, the braided sleeve 23 made of wire is at its lower end connected to the cable wire rope 21 by sewing. At the upper end of sleeve 23, two strands 27 are formed which are compressed in a clamp-like manner by the free legs of the U-shaped sleeve. The U-shaped sleeve serves for connection with a swivel hook 20. Such a design is suited, above all, for rope equipment which is subjected to minor loads, as for instance halyards, rollers, and the like. In this connection it may also be mentioned that the connection according to the invention yields particularly great advantages when the connection of cable wire ropes is involved which, in view of the material they are made of or in view of their design, cannot be spliced.

The embodiment of FIG. 8 concerns the fastening of a connecting eye to a cable wire rope. The embodiment of this figure is very similar to the embodiment of FIG. 6. The main difference consists in that the two strands 17 formed out of the sleeve material are by means of a wire eye 30 connected to each other within a pressed-on connecting sleeve 31. In this instance, the cable wire rope is extended by the length of the wire eye 30 so that a saving in material is obtained. The wire eye 30, when connected or fastened to wooden or metal posts, requires less space and is considerably more resistant to stress than a rope eye. In addition, thereto, it may be mentioned that the braided wire sleeve 13 protects the inwardly located wire loop end so that the life span of the latter is increased.

It may also be mentioned that, for producing the braided wire sleeve, any suitable wires may be used. If the cable wire rope has to absorb very high forces, steel wires may be used which are preferably corrosion- and, above all, sea water-resistant. If only minor forces are to be absorbed, also combined metal wires or even synthetic wires may be used for the preparation of the sleeves.

Instead of the illustrated splicing or sewing of the wire sleeve ends, also a connection by means of hooks may be used. Preferably, the unbraided wire ends of the sleeves are in the manner of a barb folded inwardly so that, when the rope ends are displaced, they can deflect toward the sleeve mantle and can hook themselves into the same when the sleeve is subjected to pulling stress.

It is, of course, to be understood that the present invention is, by no means, limited to the specific showing in the drawings but also encompasses any modifications within the scope of the appended claims.

What I claim is:

1. A flexible connection for cable wire rope ends, which includes: a hose-like braided sleeve of wire enveloping the cable wire rope ends to be interconnected, said sleeve when pushed together in axial direction having an inner diameter greater than, and when stretched in axial direction having an inner diameter less than the diameter of the cable wire rope ends to be interconnected, the rims of said braided sleeve which extend around the cable wire rope end to be interconnected being firmly connected to said cable wire rope ends to be interconnected, the rims of said braided sleeve which extend around the cable wire rope ends to be interconnected being sewed to said cable wire rope ends to be interconnected.

2. A flexible connection according to claim 1, in which said sleeve includes braided hammered wires.

3. A flexible connection for cable wire rope ends, which includes: a hose-like braided sleeve of wire enveloping the cable wire rope ends to be interconnected, said sleeve when pushed together in axial direction having an inner diameter greater than, and when stretched in axial direction having an inner diameter less than the diameter of the cable wire rope ends to be interconnected, the rims of said braided sleeve which extend around the cable wire rope end to be interconnected being firmly connected to said cable wire rope ends to be interconnected, the rims of said braided sleeve which extend around the cable wire rope ends to be interconnected being spliced to strands forming part of said sleeve.

4. A flexible connection according to claim 3, in which the cable wire rope ends to be interconnected taper substantially equally in the central portion of said sleeve while overlapping each other.

5. A flexible connection according to claim 3, which includes clamping means pressing together into the form of a strand that end portion of said sleeve which is intended to be connected to another rope end.

6. A flexible connection according to claim 3, in which said sleeve surrounding one rope end has that end portion thereof which is intended to be connected to another rope end provided with a plurality of strands serving as connecting ends.

7. A flexible connection according to claim 6, in which said strands at an end portion of said sleeve are near the merging area with the remainder of said sleeve held together by means of a clamp.

8. A flexible connection according to claim 6, in which the free ends of said plurality of strands are hammered together to form a leading cable.

9. A flexible connection according to claim 8, which includes a connecting sleeve pressed upon said leading cable ahead of that end thereof which is remote from said braided sleeve.

10. A flexible connection according to claim 6, in which said strands serving as connecting ends are connected to the legs of a member of U-shaped cross section.

11. A flexible connection according to claim 6, in which said strands serving as connecting ends are by means of a connecting sleeve connected to a wire cable eye, said connecting sleeve clamping together the free ends of said last mentioned strands and the free ends of said cable eye.

12. A flexible connection for cable wire rope ends, which includes: a hose-like braided sleeve of wire enveloping the cable wire rope ends to be interconnected, said sleeve when pushed together in axial direction having an inner diameter greater than, and when stretched in axial direction having an inner diameter less than the diameter of the cable wire rope ends to be interconnected, the rims of said braided sleeve which extend around the cable wire rope end to be interconnected being firmly connected to said cable wire rope ends to be interconnected, the rims of said braided sleeve which extend around the cable wire rope ends to be interconnected being hooked to strands forming part of said sleeve.

13. A flexible connection according to claim 12, in which the rims of said sleeve comprise strands forming part of said sleeve and taper toward the free ends of said strands while being provided with barbs.

* * * * *